US008384922B2

(12) United States Patent
Ohyama et al.

(10) Patent No.: US 8,384,922 B2
(45) Date of Patent: Feb. 26, 2013

(54) PRINTING CONDITION SETTING APPARATUS, PRINTING CONDITION SETTING METHOD, AND COMPUTER READABLE RECORDING MEDIUM STORED WITH PRINTING CONDITION SETTING PROGRAM

(75) Inventors: Hiroyuki Ohyama, Hachioji (JP); Masatoshi Sato, Fukushima (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1097 days.

(21) Appl. No.: 12/314,327

(22) Filed: Dec. 8, 2008

(65) Prior Publication Data

US 2009/0316184 A1 Dec. 24, 2009

(30) Foreign Application Priority Data

Jun. 20, 2008 (JP) ................................ 2008-161454

(51) Int. Cl.
G06F 3/12 (2006.01)
G06F 3/048 (2006.01)
G06K 15/00 (2006.01)
H04N 1/40 (2006.01)

(52) U.S. Cl. ...... 358/1.13; 358/3.23; 358/1.9; 358/1.16; 345/594; 715/810

(58) Field of Classification Search ........................ None
See application file for complete search history.

(56) References Cited

U.S. PATENT DOCUMENTS

2003/0112456 A1* 6/2003 Tomita et al. ................ 358/1.13
2006/0090143 A1* 4/2006 Tanaka .......................... 715/810

FOREIGN PATENT DOCUMENTS

JP 11-232059 8/1999
JP 2006-228103 8/2006

OTHER PUBLICATIONS

Notification of Reasons for Refusal issued in the corresponding Japanese Patent Application No. 2008-161454 dated Jun. 8, 2010, and an English Translation thereof.
Office Action (Decision of Refusal) dated Nov. 30, 2010, issued in the corresponding Japanese Patent Application No. 2008-161454, and an English Translation thereof.
Konica Minolta, The Essentials of Imaging, The printer driver of PostScript 3 Printer Controller provided by EEI, "Image Controller IC-406", User's Guide [Network Scanner Operations] [Copier Network Functions], the whole book, Mar. 2006.

* cited by examiner

*Primary Examiner* — Thomas Lett
(74) *Attorney, Agent, or Firm* — Buchanan Ingersoll & Rooney PC

(57) ABSTRACT

A printing condition setting apparatus having a setting parameter data storage unit for storing a plurality of setting parameter data each including at least one setting parameter registered by the user's operation among a plurality of setting parameters specifying printing conditions; a setting parameter data reception unit for receiving the user's selection of one setting parameter data among a plurality of setting parameter data stored in said setting parameter data storage unit; and a setting parameter data call unit for calling up said one setting parameter data selected by the user to display the setting parameters included in said setting parameter data on a specific operating screen.

21 Claims, 16 Drawing Sheets

FIG.5

Function data registration list

[Favorite data]
Title = Stamp + Staple
Comment =

[Setup data]
Sheet size = A4
Sheet supply tray = Manual feed
Sheet direction = vertical
N in 1 = 2 in 1
Printing type = Double side
Staple = Off
Stamp = For Internal Use Only
Color selection = Color
　・
　・

[Screen constitution registration]
Registration call = On

[My tab screen constitution]
Stamp: L
Staple: L
Printing type: R
N in 1: R

PRINTING CONDITION SETTING APPARATUS, PRINTING CONDITION SETTING METHOD, AND COMPUTER READABLE RECORDING MEDIUM STORED WITH PRINTING CONDITION SETTING PROGRAM

CROSS-REFERENCE TO RELATED APPLICATION

This application is based on Japanese Patent Application No. 2008-161454 filed on Jun. 20, 2008, the contents of which are incorporated herein by reference.

BACKGROUND

1. Technical Field

The invention relates to a printing condition setting apparatus, a printing condition setting method, and a computer readable recording medium stored with a printing condition setting program. The invention particularly relates to a printing condition setting apparatus, a printing condition setting method, and a computer readable recording medium stored with a printing condition setting program for setting up the printing condition for printing functions of a printing apparatus.

2. Description of Related Art

For a printing job executed on a printer, various setting parameters of printing conditions such as page allocation, color selection, printing type, and the likes can be applied. The user can set up various setting parameters applied to a printing job to preferred setting values using a control program called a printer driver on a PC (personal computer). There are many setting parameters provided by the printer driver, and the number of setting parameters has even been on a rise in recent years. A plurality of setting parameters are classified in accordance with related functions and displayed on an operating screen, which is selectable on a GUI screen window by selecting a tab. Therefore, in order for a user to set up a desired printing condition, the user must first switch the operating screen by selecting a tab to display a desired setting parameter, and then modify the setting value (in other words, the setting item) of the setting parameter, thus making the printing condition setting work more complex.

As a means of solving this problem, an art has been proposed in which all those setting parameters for which the setting values are frequently modified by the user are displayed aggregately on a specific operating screen.

Refer to the printer driver of PostScript 3 Printer Controller provided by EFI, Image Controller IC-406, available on the World Wide Web at "konicaminolta.jp/business/download/copiers/efi/detail.html".

According to this non-patent document technology, all those setting parameters for which the setting values are frequently modified by the user can be displayed aggregately on a specific operating screen by the user adding or removing setting parameters to or from an operating screen that can be edited by the user.

However, even for the same user, the setting parameters that need to be modified frequently may change depending on the printing scene. Therefore, even if the user has edited the operating screen to display the desired setting parameters, there may be a case for the same user to switch the operating screen by selecting a tab to modify the setting value of a certain setting parameter when the printing scene changes.

SUMMARY

To achieve at least one of the abovementioned objects, the printing condition setting apparatus reflecting one aspect of the present invention comprises a setting parameter data storage unit, a setting parameter data reception unit, and a setting parameter data call unit. The setting parameter data storage unit stores a plurality of setting parameter data each including at least one setting parameter registered by the user's operation among a plurality of setting parameters specifying printing conditions. The setting parameter data reception unit receives the user's selection of one setting parameter data among said plurality of setting parameter data stored in said setting parameter data storage unit. The setting parameter data call unit calls up said one setting parameter data selected by the user to display the setting parameters included in said setting parameter data on a specific operating screen.

It is preferable that said printing condition setting apparatus further comprises a setup data storage unit that stores a plurality of setup data including setting values of said setting parameters, and a setup data call unit that calls up one setup data among said plurality of setup data to reflect the setting values included in said setup data on said setting parameters.

It is preferable that said printing condition setting apparatus further comprises a association reception unit that receives the user's selection on whether or not said setting parameter data should be stored in association with said setup data, and that said setting parameter data is stored in association with said setup data in said setting parameter data storage unit when the user selects to store said setting parameter data in association with said setup data.

It is preferable that said printing condition setting apparatus further comprises an identifier assignment unit that assigns an identifier for allowing the user to identify whether or not said setting parameter data and said setup data are stored in association with each other.

It is preferable that said printing condition setting apparatus further comprises a position data storage unit that stores position data specifying the position of said setting parameter on said specific operating screen, and an operating screen constitution unit that displays said setting parameter on said specific operating screen based on said position data.

It is preferable that said printing condition setting apparatus further comprises a setting parameter reception unit that receives the user's selection of said setting parameter, and a first setting parameter registration unit that registers said selected setting parameter in said setting parameter data.

It is preferable that said printing condition setting apparatus further comprises a setup judgment unit that judges whether or not the setting value of said setting parameter is modified from its initial value, and a second setting parameter registration unit that registers the setting parameter whose setting value has been modified in said setting parameter data.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 5 is a drawing showing an example of data stored as a favorite setting.

DETAILED DESCRIPTION

The embodiment of this invention will be described below with reference to the accompanying drawings.

Figure 1:
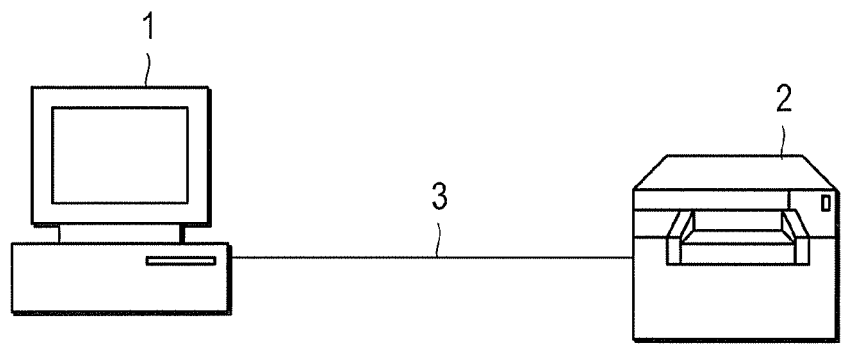
FIG. 1 is a block diagram showing the overall constitution of a printing system according to an embodiment of the present invention.

FIG. 1 is a block diagram showing the overall constitution of a printing system according to an embodiment of the present invention.

As shown in FIG. 1, the printing system according to the present embodiment has a PC 1 and a printer 2. The PC 1 and the printer 2 are communicably connected with each other via a network 3.

The network 3 consists of various networks such as a LAN connecting computers and network equipment according to standards such as Ethernet, Token Ring, and FDDI, or a WAN that consists of several LANs connected by a dedicated line. The types and the number of equipment connected to the network 3 are not limited to those shown in FIG. 1.

Figure 2:
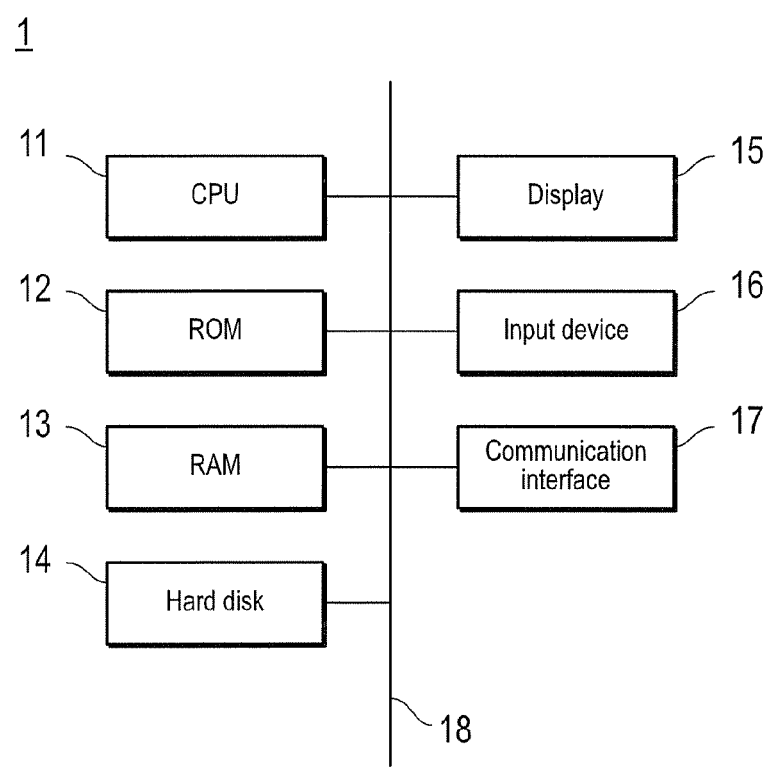
FIG. 2 is a block diagram showing the constitution of the PC shown in FIG. 1.

FIG. 2 is a block diagram showing the constitution of the PC shown in FIG. 1. The PC 1 as a printing condition setting apparatus includes a CPU 11, a ROM 12, a RAM 13, a hard disk 14, a display 15, an input device 16, and a communication interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The display 15 is typically a CRT or a LCD and displays various kinds of information. The input device 16 consists of pointing devices such as a mouse, a keyboard, and others, and is used for making various kinds of inputs.

The communication interface 17 is an interface for communications between other equipment such as the printer 2 via the network 3, for which various local connection interfaces, e.g., network interfaces such as Ethernet, Token Ring, and FDDI standards, serial interfaces such as USB and IEEE 1394, parallel interfaces such as SCSI, IEEE 1284, and wireless communication interfaces such as Bluetooth®, IEEE 802.11, HomeRF, IrDA, as well as telephone circuit interfaces for connection to telephone circuits can be used.

A document file preparation application and a printer driver are installed on the hard disk 14. The printer driver is used to set up various parameters of the printing condition based on the user's operations using the printing setting screen to be described later and to generate printing data of a format that can be processed by the printer 2 based on the data provided by the document file preparation application.

Figure 3:
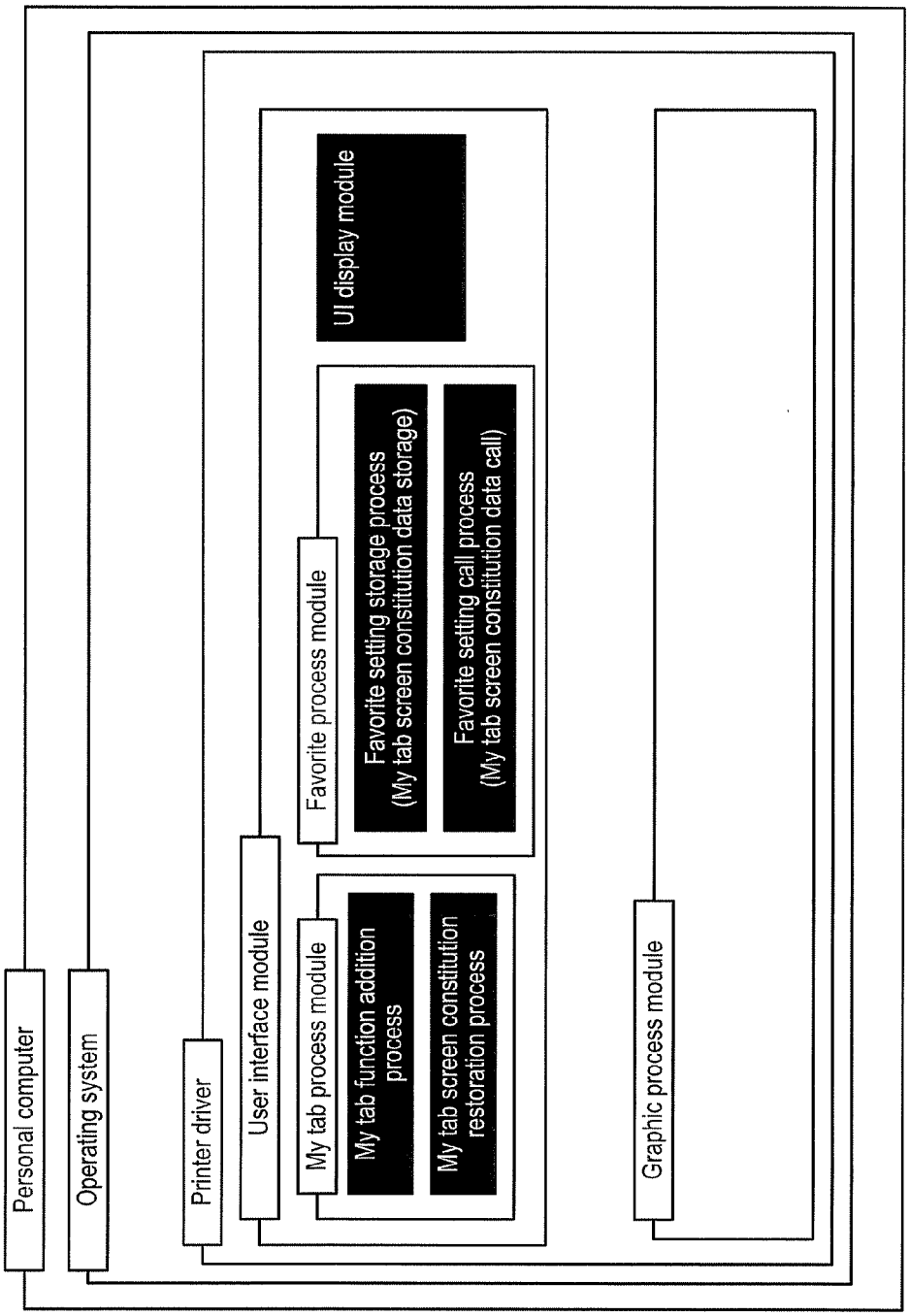
FIG. 3 is a drawing showing a modular constitution of the PC in which the printer driver is installed.

FIG. 3 is a drawing showing a modular constitution of the PC in which the printer driver is installed.

As shown in FIG. 3, the printer driver operates under the control of the operating system on PC1. The printer driver has a user interface module and a graphic process module, where the user interface module has a My tab process module, a favorite process module, and UI display module. My tab process module executes My tab function additional process and My tab screen constitution restoration process. The favorite process module executes a favorite setting reservation process (My tab screen constitution data storage process) and favorite setting call process (My tab screen constitution data call process). The detail of each module's process will be described later.

Figure 4:
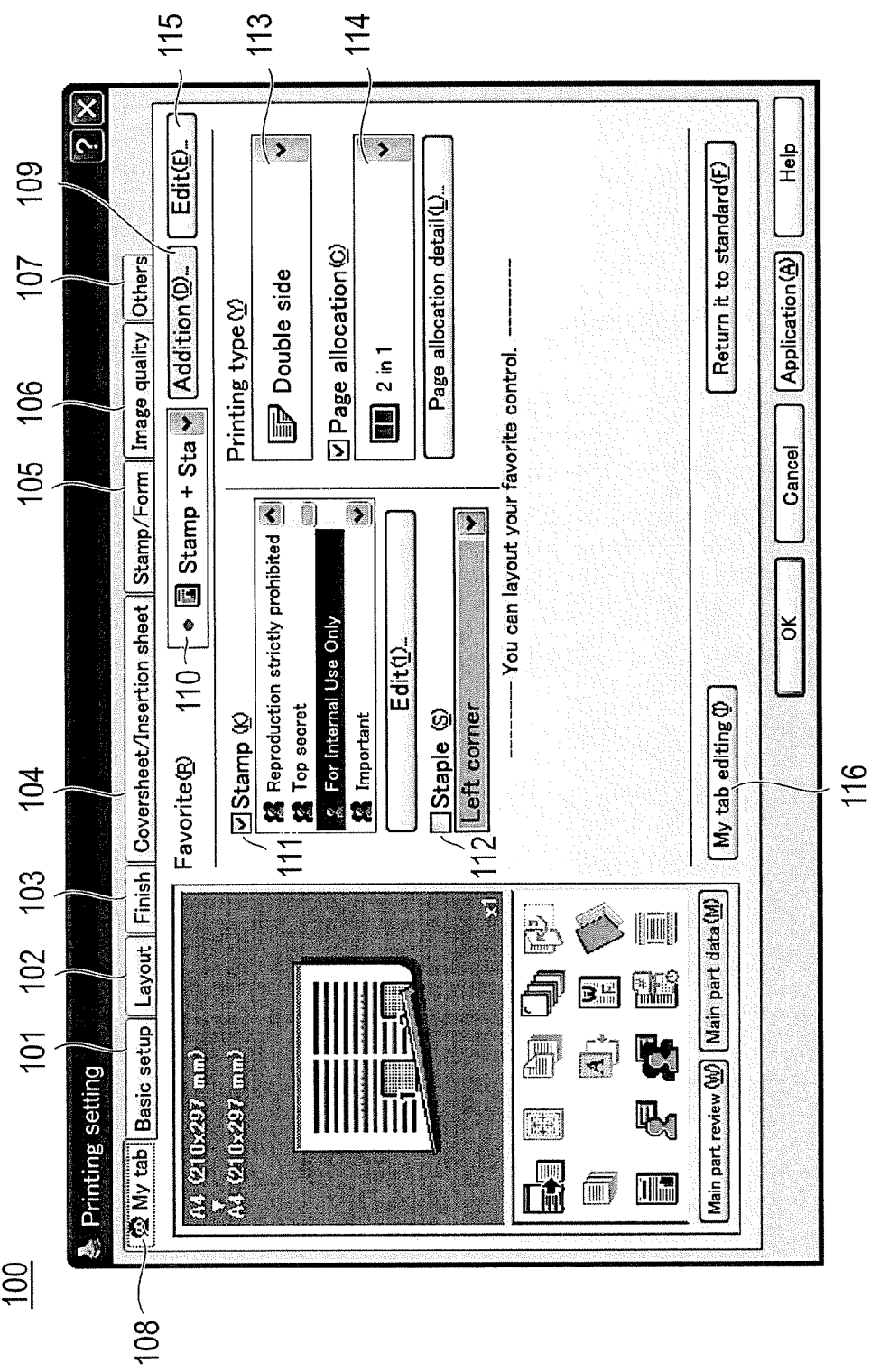
FIG. 4 is a drawing showing an example of printing setting screen displayed on a display by the printer driver.

FIG. 4 is a drawing showing an example of printing setting screen displayed on a display by the printer driver. A printing setting screen 100 has a plurality of tabs 101-108 for switching the operating screen, an additional button 109 for storing the favorite setting, and a list box 110 for calling the favorite setting, as shown in FIG. 4.

The plurality of tabs 101-108 includes general tabs 101-107 and a My tab 108. The plurality of tabs 101-108 are assigned to operating screens and selection of a tab causes the operating screen to switch. A plurality of setting parameters specifying the printing condition are classified according to their functions and displayed on the operating screens corresponding to the general tabs 101-107. The operating screen corresponding to My tab 108 (hereinafter called "My tab screen") displays at least one setting parameter registered by the user's operation among a plurality of setting parameters displayed on the operating screens corresponding to the general tabs 101-107. In case of this drawing, My tab screen displays "Stamp" 111 registered from the operating screen of Stamp/Form tab 105, "Staple" 112 registered from the operating screen of Finish tab 103, and "Printing Type" 113 and "Page Allocation" 114 registered from the operating screen of Layout tab 102. My tab screen is constituted in such a way as to allow the user to edit and the setting parameter is registered based on the selection of the user. The method of registering a setting parameter to My tab screen will be discussed later. One setting parameter displayed on My tab screen and the identical setting parameter displayed on the operating screen corresponding to one of the general tabs 101-107 are linked each other. If the setting value of a setting parameter on one operating screen is modified, the setting value of the setting parameter on the other operating screen is also modified.

The additional button 109 is provided for storing the setup data of the present printing setting screen 100 together with the screen constitution data of My tab screen as the favorite setting. The list box 110 is provided for displaying a list of a plurality of pre-stored favorite settings to allow the user to select one favorite setting from the list.

The printing setting screen 100 is provided with various operating buttons such as an editing button 115 for editing the favorite setting after storing it, and a My tab editing button 116 for editing the screen constitution of My tab screen.

FIG. 5 is a drawing showing an example of data stored as a favorite setting.

The function data registration list that shows the data stored as the favorite setting includes favorite data, setup data, screen constitution registration data, and My tab screen constitution data as shown in FIG. 5. The favorite data includes the title of the favorite setting (e.g., "Stamp+Staple"). The setup data includes the setting values of a plurality of setting parameters that specify the printing condition (sheet size=A4, N in 1=2 in 1, etc.). The screen constitution registration data includes the data whether or not to call My tab screen constitution data when calling up the favorite setting. My tab screen constitution data includes the setting parameter data including the setting parameters (e.g., "Stamp", "Staple", "Printing Type" and "Page Allocation") that are displayed aggregately on My tab screen, and the position data that specifies the positions (R or L) of the setting parameter on My tab screen.

Figure 6:
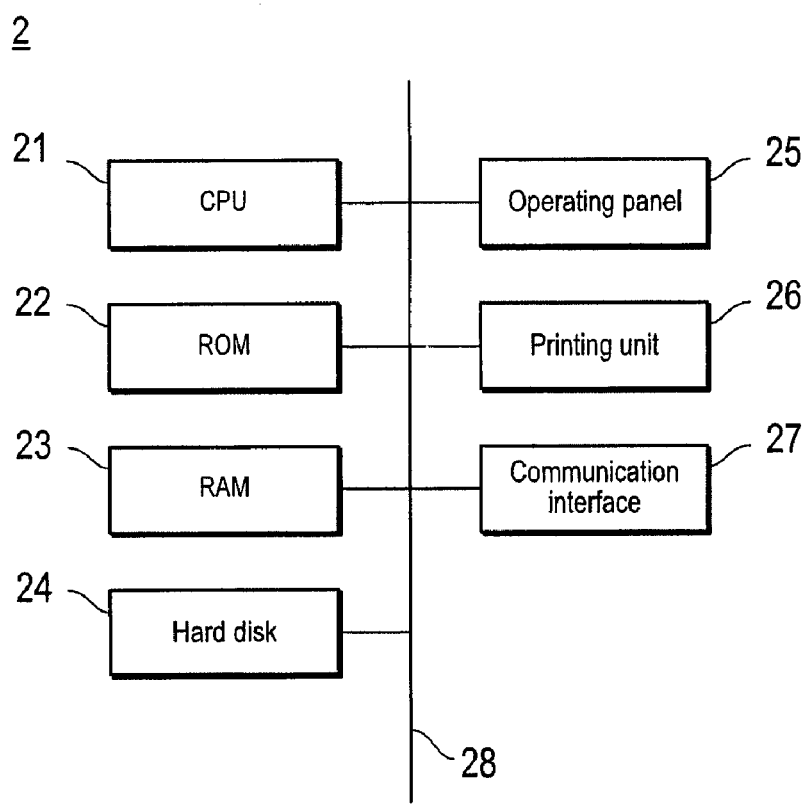
FIG. 6 is a block diagram showing the constitution of the printer shown in FIG. 1.

FIG. 6 is a block diagram showing the constitution of printer 2 shown in FIG. 1. Printer 2 has a CPU 21, a ROM 22, a RAM 23, a hard disk 24, an operating panel 25, a printing unit 26, and a communication interface 27, all of which are interconnected with each other via a bus 28 for exchanging signals. The descriptions of those parts of the printer 2 that have the same functions as those of the corresponding parts of the PC 1 will be omitted here to avoid being duplicative.

The operating pane 125 is equipped with a touch panel, a ten-key pad, a start button, a stop button and others to be used for displaying various data and entering various instructions. The printing unit 26 prints various data on a recording medium such as paper using a known image forming process such as an electronic photography type process.

The PC 1 and the printer 2 can each contain constitution elements other than those described above, or may lack a portion of elements described above.

For a printing job executed on a printer 2 in a printing system of the present embodiment constituted as above, various setting parameters of printing conditions such as Page Allocation, color selection, Printing Type, and the likes can be applied. The user sets up the printing condition by calling up the desired favorite setting on the printing setting screen 100 displayed on the display 15 of PC 1, and modifying the setting values of the setting parameters as necessary.

Figure 7:
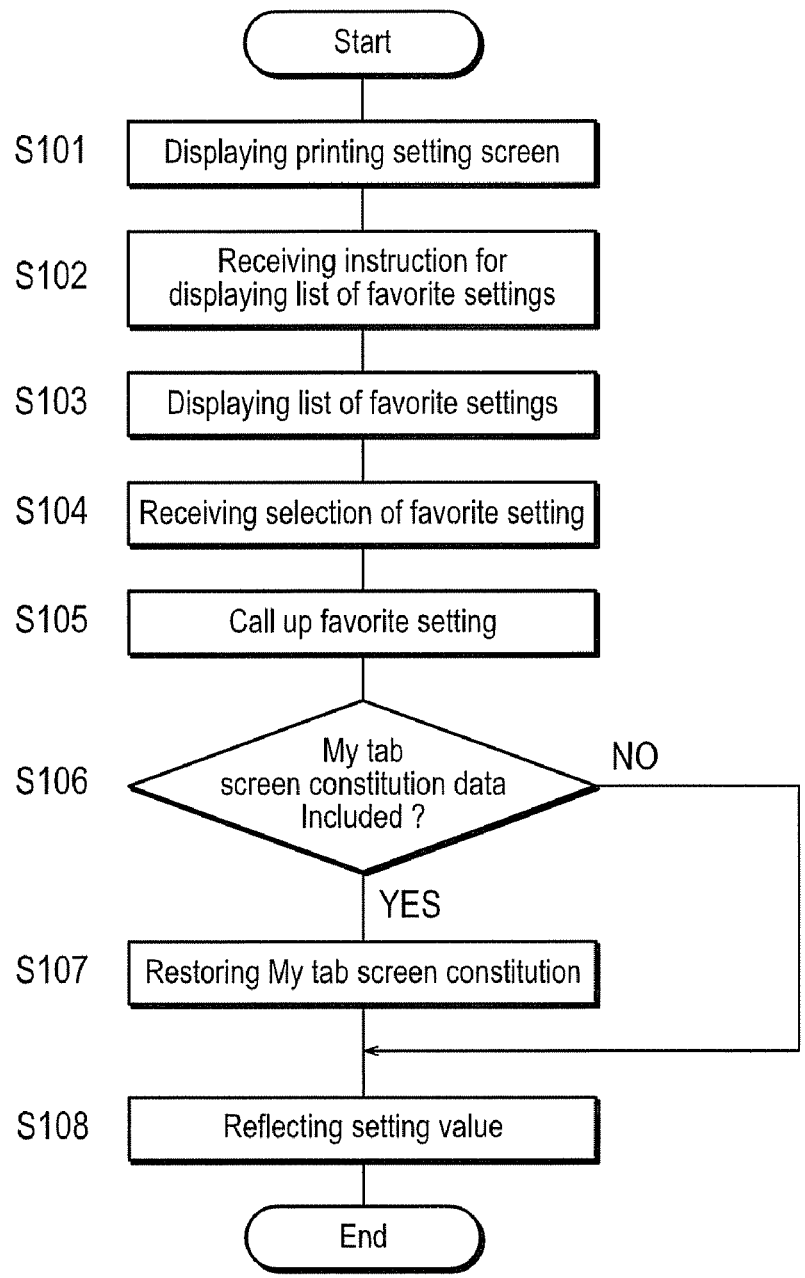
FIG. 7 is a flowchart showing the process of calling up a favorite setting of the printing condition in the PC shown in FIG. 1.

The process of calling up the favorite setting of the printing condition on the PC1 is described referring to FIGS. 7-11 in the following. The algorithm shown in the flowchart of FIG. 7 is stored as a program in a storage unit such as a hard disk 14 of the PC 1 and executed by the CPU 11.

First, the printing setting screen 100 is displayed (step S101). The printing setting screen 100 may be opened from the application at the time of printing or from the property of the printer driver. The printing setting screen 100 of the present embodiment shows that My tab 108 being selected as the default setting. No setting parameter is registered on My tab screen of the default setting parameter in the present embodiment. However, different from the present embodiment, My tab screen of the default setting parameter may have a plurality of setting parameters registered in advance.

Next, a display instruction of the list of favorite settings is received (step S102). In the present embodiment, a display instruction of the list of the favorite settings can be received by clicking the right side buttons of the pull-down menu of the list box 110.

Figure 8:
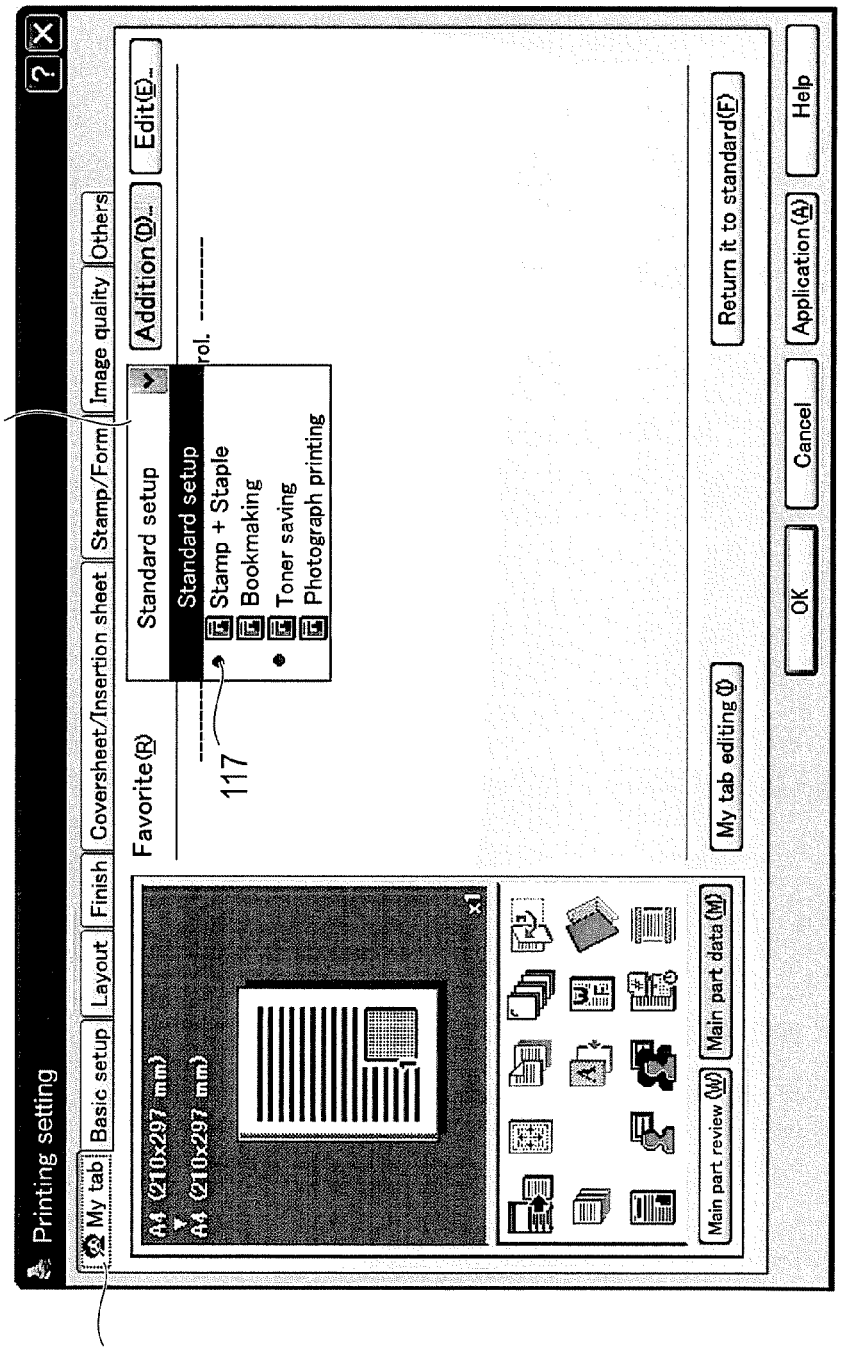
FIG. 8 is a drawing showing an example of My tab screen of a condition in which the favorite list is shown.

Next, the list of favorite settings is shown (step S103). In the present embodiment, a list of favorite settings pre-registered in the favorite list box 110 is displayed as shown in FIG. 8. The favorite setting that includes My tab screen constitution data is provided with an identifier 117 for allowing the user to identify that the favorite setting includes My tab screen constitution data.

Next, the user's selection of the favorite setting is received (step S104). In the present embodiment, a selection of one of the favorite setting is received, when the particular one of the favorite setting is clicked from the list of favorite settings shown in FIG. 8.

Next, the selected favorite setting is called up (step S105). In the present embodiment, the function data registration list of the favorite setting selected in the process shown in step S104 is called up from the hard disk 14, and developed in the RAM 13.

Figure 9:
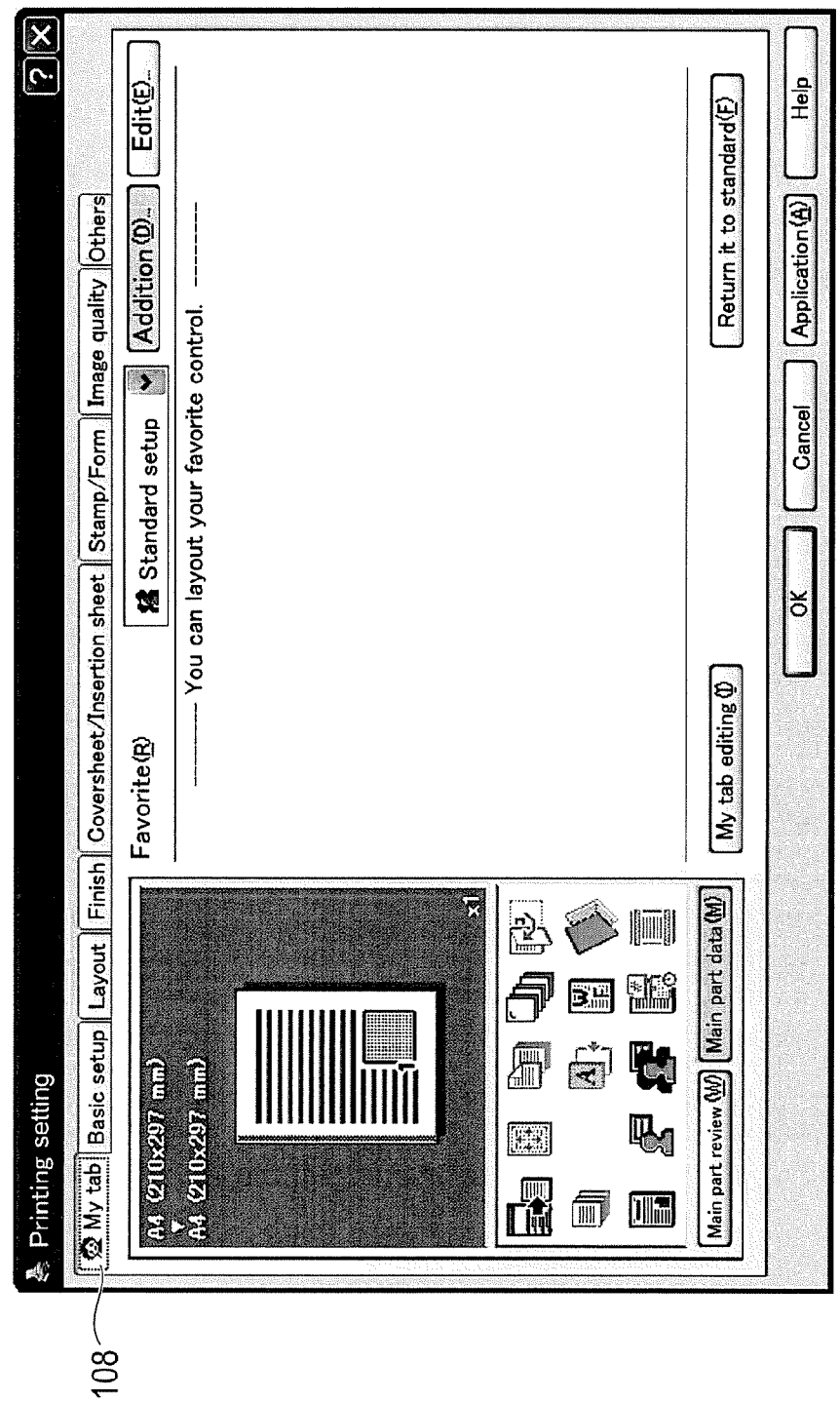
FIG. 9 is a diagram showing an example of My tab screen of the default setting.

A judgment is made as to whether the favorite setting being called up includes My tab screen constitution data or not (step S106). In the present embodiment, a judgment is made as to whether or not the favorite setting includes My tab screen constitution data based on the judgment of On/Off of the screen constitution registration data in the function data registration list called up in the process shown in the step S105. If the favorite setting does not include My tab screen constitution data (step S106: No), the setting values registered in the function data registration list of the favorite setting are reflected on each setting parameter (step S108) and the process is finished. In the present embodiment, the setting values of the favorite setting are reflected on the setting parameters displayed on the operating screen corresponding to the general tabs 101-107 while maintaining My tab screen in the default setting as shown in FIG. 9.

Figure 10:
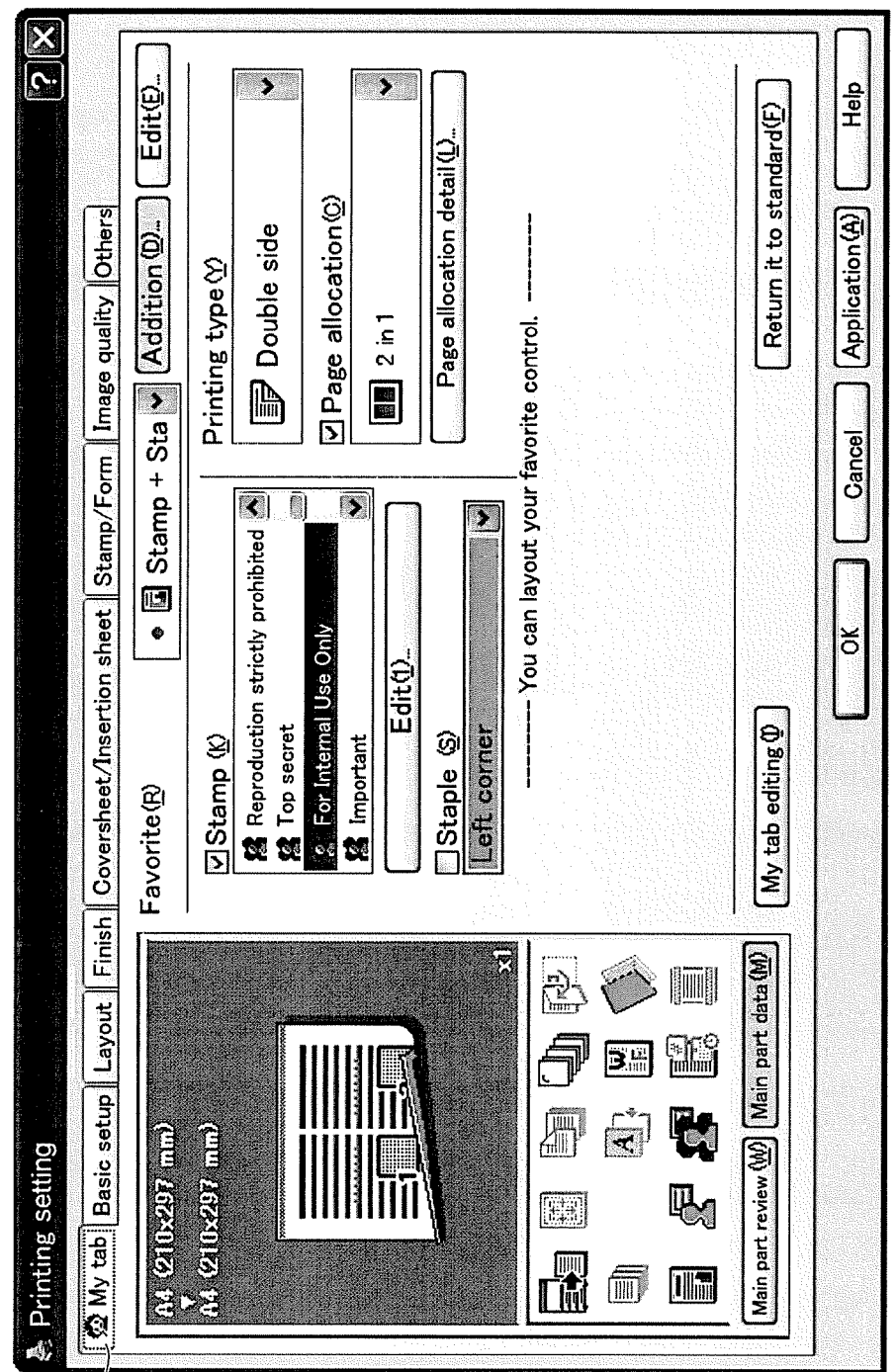
FIG. 10 is a drawing showing an example of My tab screen of a condition in which the favorite setting is called up.

On the other hand, if the favorite setting includes My tab screen constitution data (step S106: Yes), the screen constitution of My tab screen is restored based on My tab screen constitution data of the function data registration list of the favorite setting (step S107). In the present embodiment, the four setting parameters, "Stamp", "Staple", "Printing Type" and "Page Allocation" included in My tab screen constitution data are displayed on My tab screen as shown in FIG. 10. More specifically, "Stamp" and "Staple" are displayed on the left side, while "Print type" and "Page Allocation" are displayed on the right side of My tab screen based on the position data of the favorite setting. Then, the setting values of the favorite setting are reflected on the setting parameters (step S108), and the process is finished.

As can be seen from the above, a favorite setting is called up from a plurality of pre-stored favorite settings, and the setting values registered in the favorite setting are reflected on the setting parameters according to the process of the flow chart shown in FIG. 7. Also, if the favorite setting includes My tab screen constitution data, the setting values are reflected on the setting parameters and the setting parameters stored as the favorite setting are displayed on My tab screen.

Figure 11:
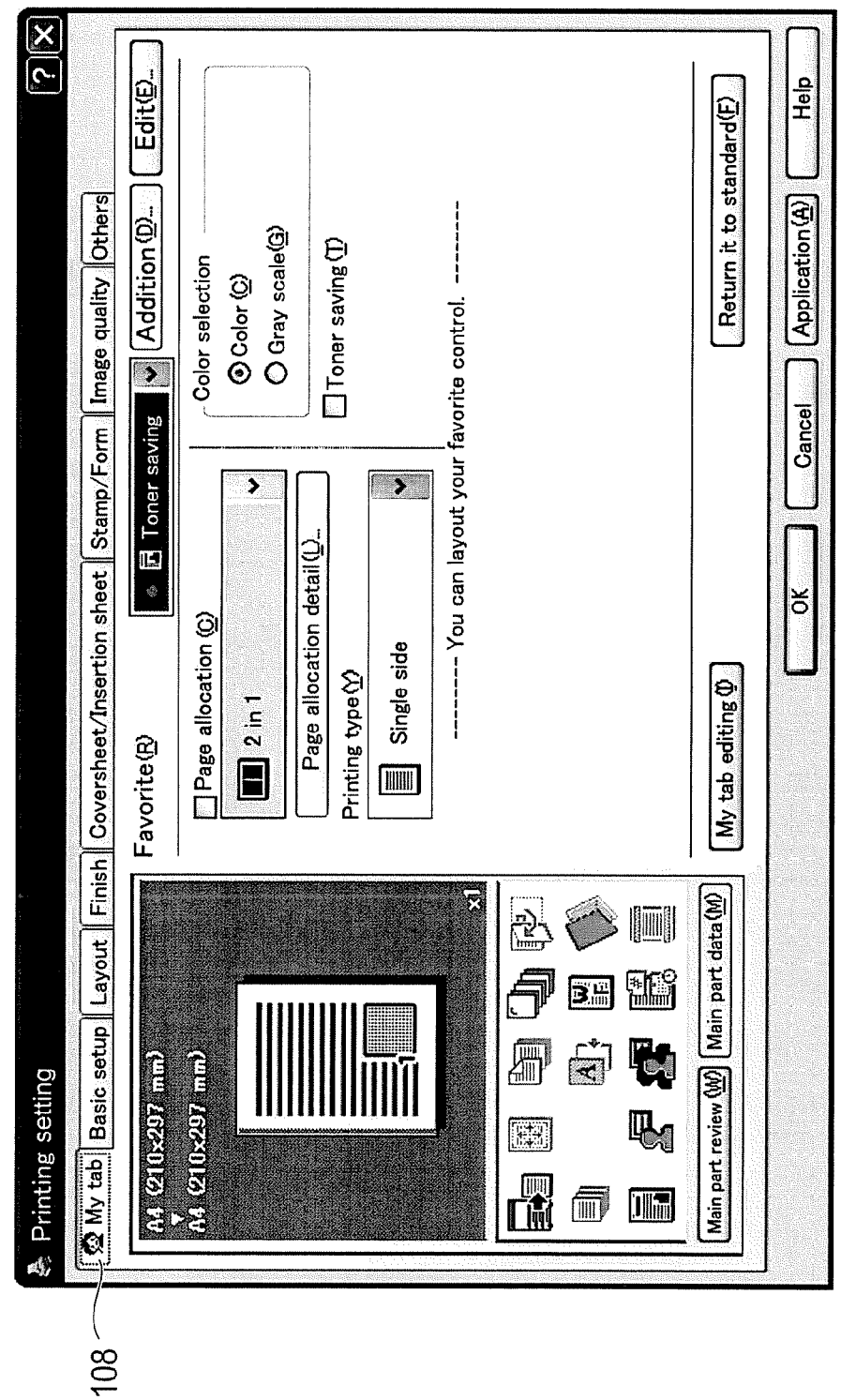
FIG. 11 is a drawing showing another example of My tab screen of a condition in which the favorite setting is called up.

Therefore, the user can display the desired setting parameters on My tab screen by selecting the desired favorite setting from the plurality of favorite settings based on the printing scene. For example, the user can display the four setting parameters, "Page Allocation", "Printing Type", "color selection" and "toner saving" on My tab screen as shown in FIG. 11 based on the printing scene. The user can set up a printing condition without selecting a tab in order to switch the operating screen by simply modifying the setting values of the setting parameters displayed on My tab screen.

For example, in a printing scene where the user prepares a conference material, the user trial-print the material and then print the final material after correcting the contents as necessary. In such a printing scene, the user first selects a favorite setting titled "Stamp+Staple" from a plurality of favorite settings to display the four setting parameters, "Stamp", "Staple", "Printing Type" and "Page Allocation" on My tab screen.

Next, the user confirms on My tab screen that the setting value of the "Stamp" is "For Internal Use Only" and the setting value of "Staple" is "Off" on My tab screen. In order to save printing paper, the user confirms that the setting value of the "Printing Type" is "Double Side" and modifies the setting value of "Page Allocation" (e.g., 2 in 1 in case of a four page material, or 4 in 1 in case of a 20 page material) according to the number of pages of the material. The user then test-prints the material.

The user checks the test-printed material, modify its content as necessary, and final-prints the material. In the final printing, the user first confirms that the setting value of "Stamp" is "For Internal Use Only" on My tab screen. Next, the user modifies the setting value of "Staple" to "On," the setting value of "Printing Type" to "Single Side" and the setting value of "Page Allocation" to "Off". The user then final-prints the material.

As such, in the printing scene where the user prepares the conference material, the user can easily modify the setting values of the setting parameters by simply calling up the favorite setting where the four setting parameters, i.e., "Stamp", "Staple", "Printing Type" and "Page Allocation," are displayed on My tab screen without having to switch the operating screen. Thus, the user can easily set up the printing condition by calling up an optimum favorite setting depending on the printing scene, if a plurality of My tab screen constitution data are pre-stored as favorite settings in a storage unit such as the hard disk 14 for responding to various printing scenes.

Figure 12:
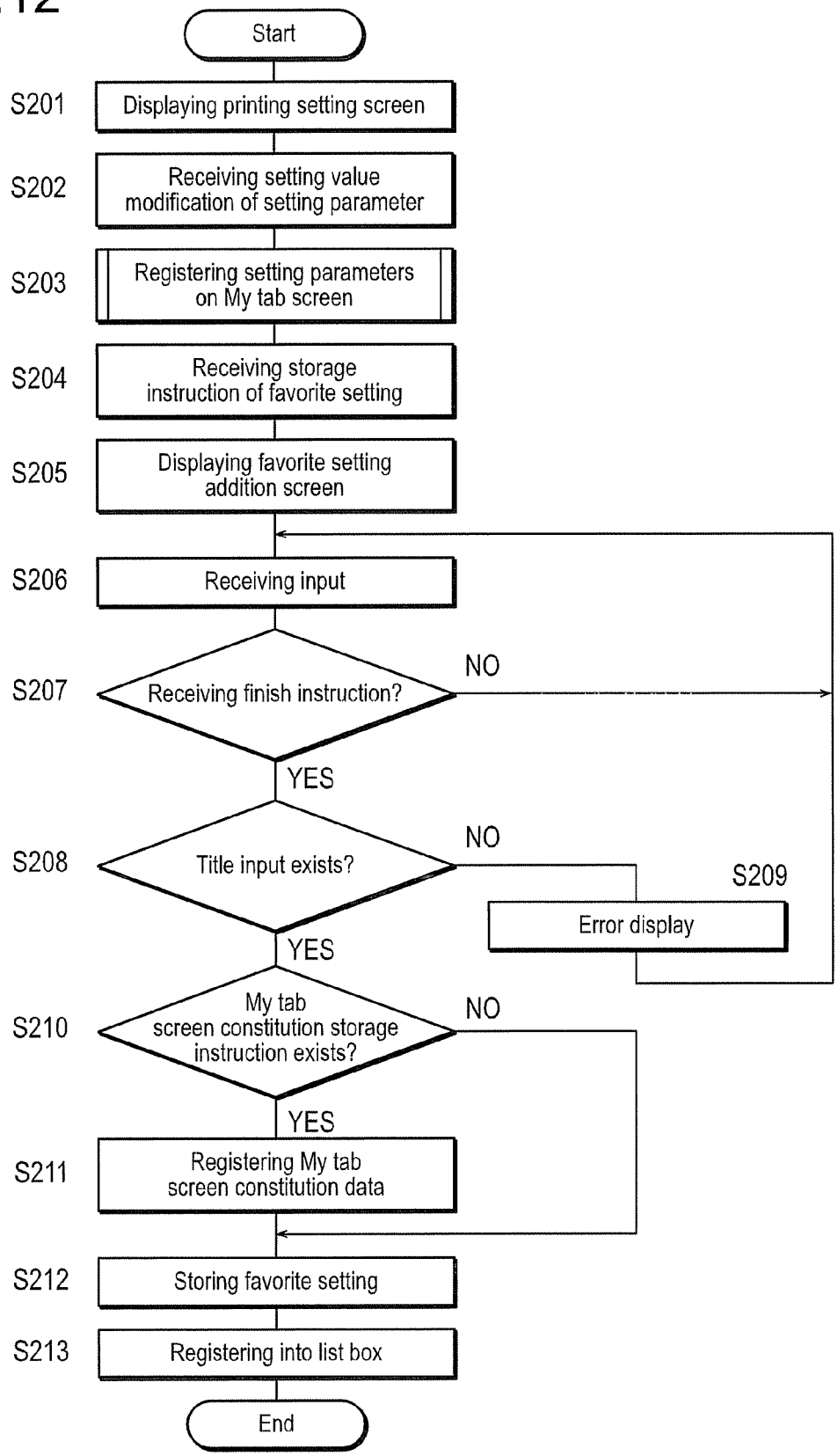
FIG. 12 is a flowchart showing the process of saving a favorite setting of the printing condition in the PC shown in FIG. 1.

Next, a process of storing favorite settings of printing conditions in the PC 1 is described with reference to FIG. 12 through FIG. 16. The algorithm shown in the flowchart of FIG. 12 is stored as a program in a storage unit as the hard disk 14 of the PC 1 and executed by the CPU 11.

Figure 13A:
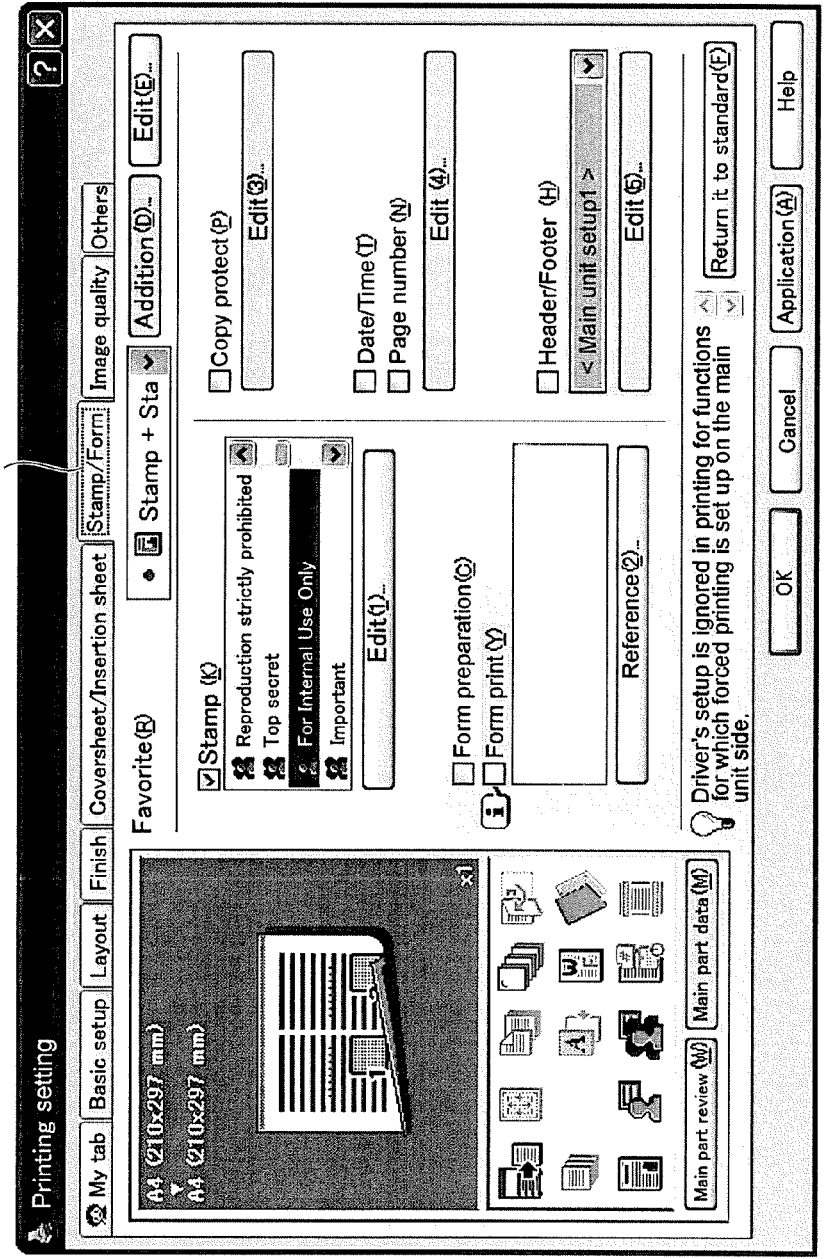
FIG. 13A is a drawing showing an example of printing setting screen where a setting value of a setting parameter is modified.
Figure 13B:
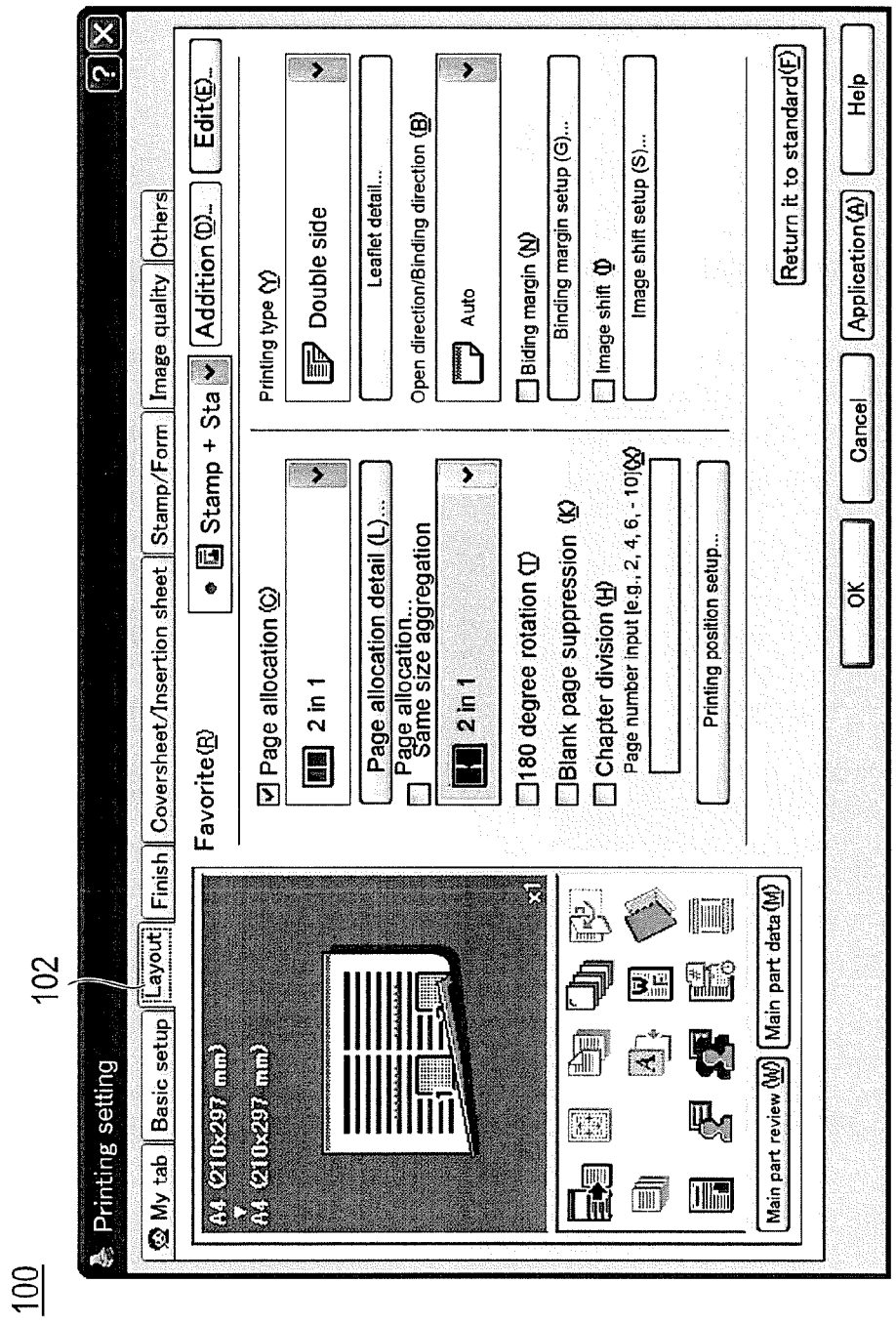
FIG. 13B is a drawing showing an example of printing setting screen where setting values of setting parameters are modified.
Figure 13C:
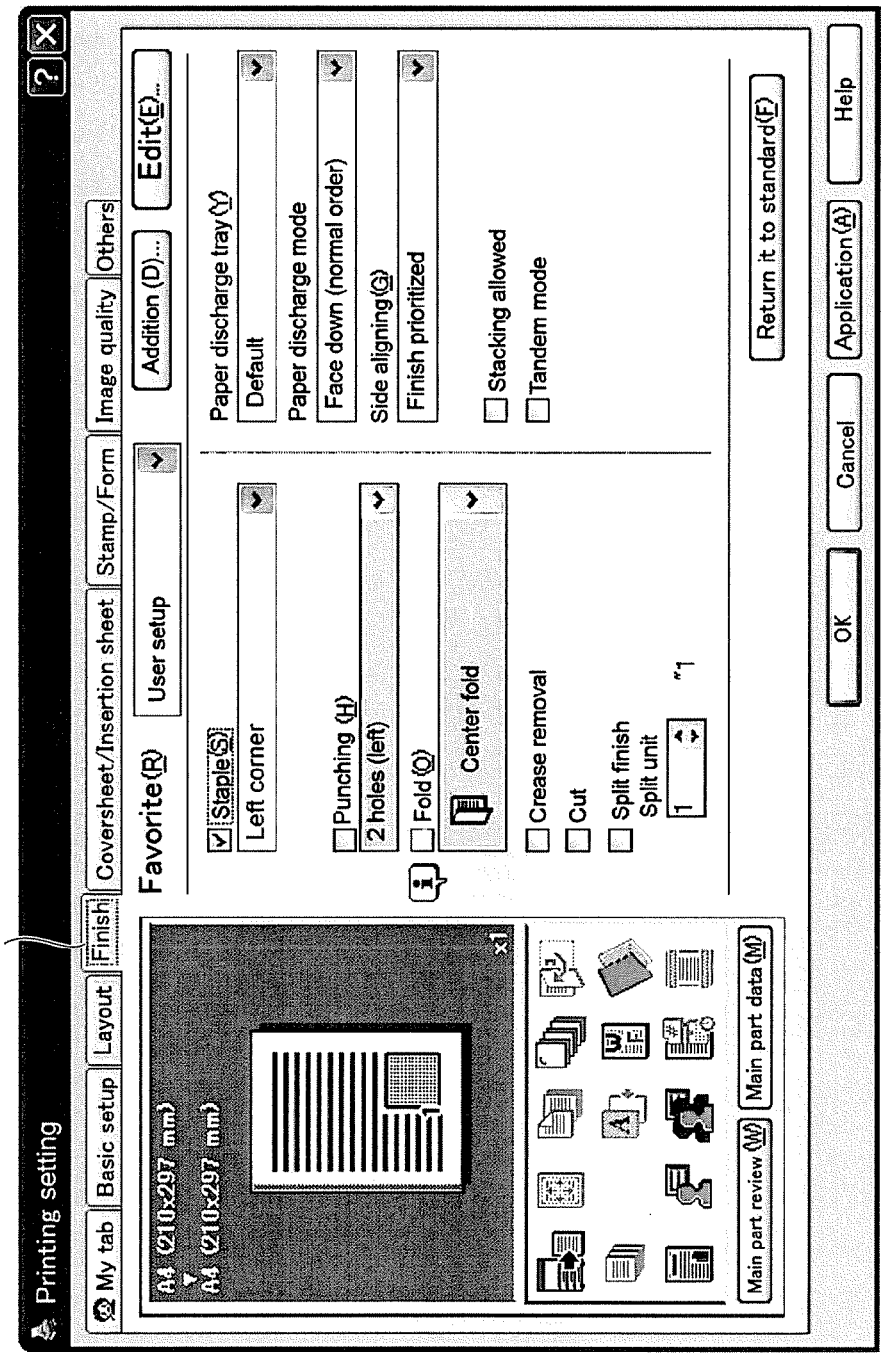
FIG. 13C is a drawing showing an example of printing setting screen where a setting value of a setting parameter is modified.

First, the printing setting screen 100 is displayed (step S201). Next, the modifications of the setting values of the setting parameters are received (step S202). In the embodiment, the user selects, for example, the Stamp/Form tab 105 to switch the operating screen, and modifies the setting value of "Stamp" to "For Internal Use Only" as shown in FIG. 13A. Next, the user selects the Layout tab 102 to switch the operating screen, and modifies the setting values of "Page Allocation" and "Printing Type" to "2 in 1" and "Both Side" respectively as shown in FIG. 13B. Then, the user selects the Finish tab 103 to switch the operating screen, and modifies the setting value of "Staple" to "Left Corner" as shown in FIG. 13C. The process shown in step S202 is repeated to all setting parameters for which the setting values are to be modified from the default values.

Next, the setting parameters are registered on My tab screen (step S203). In the present embodiment, the setting parameters selected by the user are registered on My tab screen. The details of registering a setting parameter to My tab screen will be discussed later. The order of executions of step S202 and step S203 may be reversed and also step S202 and step S203 may be alternately repeated.

Next, the storage instruction of the favorite setting is received (step S204). In the present embodiment, a storage instruction for the favorite setting can be received by clicking of the additional button 109 of the printing setting screen 100.

Figure 14:
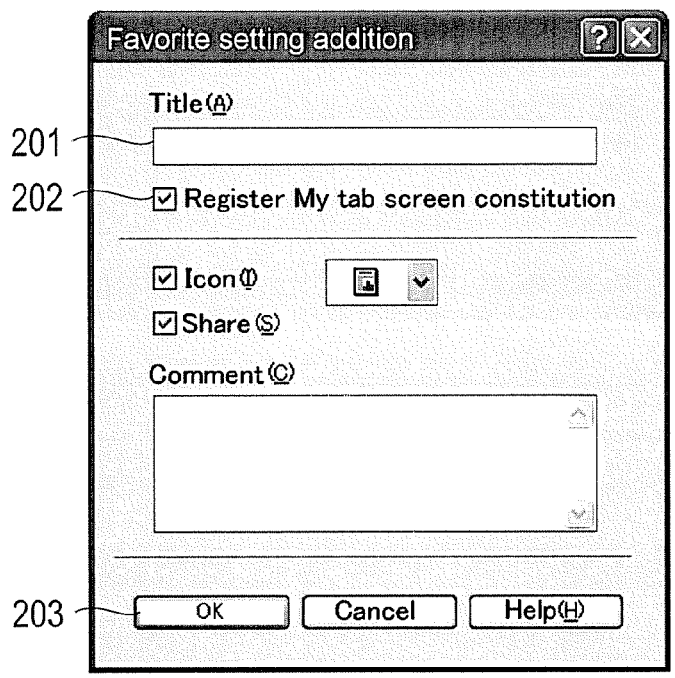
FIG. 14 is an example of an addition of favorite setting screen displayed on the display by the printer driver.

Next, a favorite setting addition screen 200 is displayed (step S205). As shown in FIG. 14, the favorite setting addition screen 200 has an input box 201, a check box 202, and an OK button 203. The input box 201 is provided for receiving the input of the favorite setting title. The check box 202 is provided for receiving the user's selection on whether or not My tab screen constitution data is to be stored as a favorite setting in addition to the setup data of the present printing setting screen 100. The OK button 203 is provided for receiving the finish instruction.

Then, the data input into the favorite setting addition screen 200 by the user's operation is received (step S206). In the present embodiment, an input to the input box 201, an input to the check box 202, or a finish instruction to the OK button 203 is received.

Next, a judgement is made as to whether or not a finish instruction is received (step S207). If a finish instruction is not yet received (step S207: No), the processes of step S206 and thereafter are repeated until a finish instruction is received. On the other hand, if a finish instruction is received (step S207: Yes), a judgment is made as to whether or not a favorite setting title is inputted (step S208). If no favorite setting title is inputted (step S208: No), an error message is displayed (step S209), and the processes of step S206 and thereafter will be repeated until a favorite setting title is inputted.

On the other hand, if a favorite setting title is inputted (step S208: Yes), a judgment is made as to whether or not there is an instruction for storing My tab screen constitution data in addition to the setup data of the present printing setting screen 100 as a favorite setting (step S210) In the present embodiment, a judgment is made as to whether or not there is an instruction for storing My tab screen constitution data as a favorite setting by judging the On/Off of the check box 202.

If there is an instruction for storing My tab screen constitution data (step S210: Yes), My tab screen constitution data is registered in the function data registration list of the favorite setting (step S211). The function data registration list of the favorite setting including the setup data and My tab screen constitution data is stored (step S212). On the other hand, if there is no instruction for storing My tab screen constitution data (step S210: No), My tab screen constitution data does not get registered in the function data registration list of the favorite setting, and the function data registration list of the favorite setting is stored (step S212). Then, the function data registration list is registered into the registration list box (step S213), and the process is finished.

As can be seen from the above, the present setting of the printing setting screen 100 is stored as the favorite setting according to the process of the flowchart shown in FIG. 12. In this instance, My tab screen constitution data is stored in association with the setup data of the printing setting screen 100 based on the user's selection.

Furthermore, in the present embodiment, the user's selection on whether or not to store My tab screen constitution data in addition to the setup data is received at the time of storing the favorite setting. However, it is also possible to set up the system differently from the present embodiment in such a way as to store My tab screen constitution data in addition to the setup data constantly when storing the favorite setting, and to receive the user's selection on whether or not to call up My tab screen constitution at the time of calling up the favorite setting. Alternatively, it can be constituted to have My tab screen constitution data stored and called up as the favorite setting constantly without having to rely on the user's selection.

Figure 15:
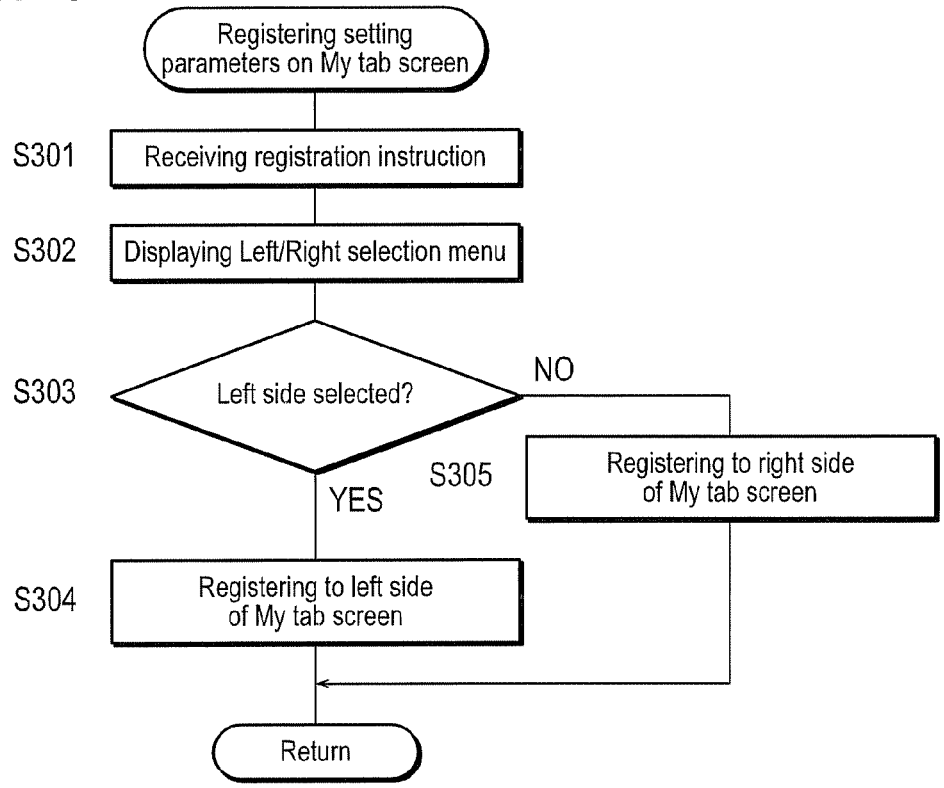
FIG. 15 is a flow chart showing My tab screen registration process of the setting parameter of step S203 in the flowchart shown in FIG. 12.

FIG. 15 is a flow chart for describing My tab screen registration process of the setting parameter of step S203 in the flowchart shown in FIG. 12. The algorithm shown in the flowchart of FIG. 15 is stored as a program in a storage unit such as a hard disk 14 of the PC 1 and executed by the CPU 11.

First, the user's instruction for registration of the setting parameters to be registered on My tab screen is received (step S301). In the present embodiment, a registration instruction is received as the user right-clicks the mouse on one of the setting parameters (e.g., "Stamp") displayed on the general operating screens 101 through 107 of the printing setting screen 100.

Figure 16:
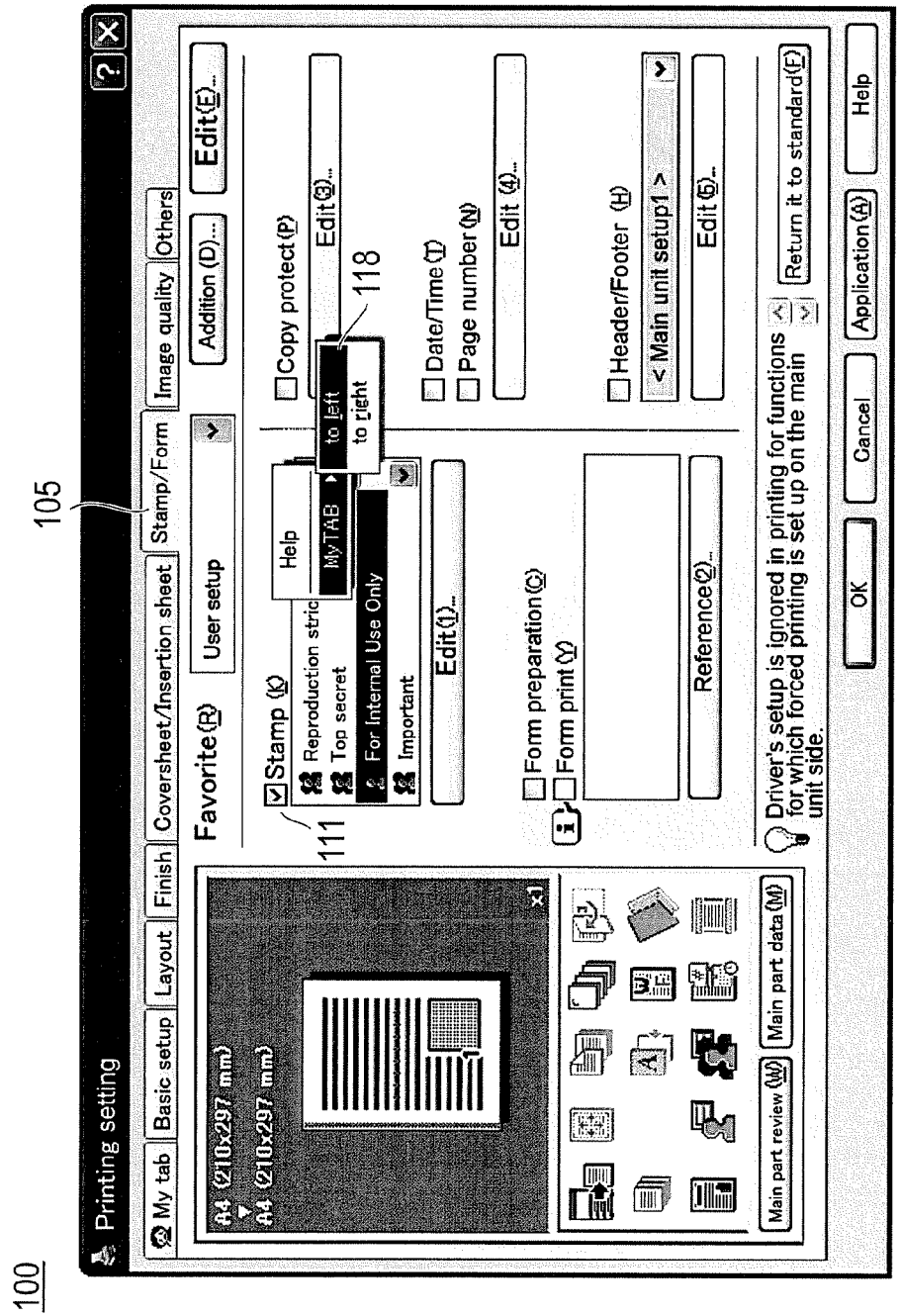
FIG. 16 is a drawing showing an example of printing setting screen where the left/right selection menu is displayed.

Next, the left-right selection menu is displayed for the user to select the position of the setting parameter on My tab screen (step S302). In the present embodiment, the menu screen 118 is displayed containing "to left" and "to right" for the user to select the position as shown in FIG. 16.

Next, a judgment is made as to whether or not the left side is selected as the position of the setting parameter on My tab screen (step S303). In the present embodiment, it is judged that the left side is selected as the position of the setting parameter on My tab screen when "to left" is clicked. If the left side is selected as the position of the setting parameter on My tab screen (step S303: Yes), the setting parameter selected in step S301 is registered on the left side of My tab screen (step S304), and the process is finished. On the other hand, if the left side is not selected as the position of the setting parameter on My tab screen (step S303: No), the setting parameter selected in step S301 is registered on the right side of My tab screen (step S305), and the process is finished.

As can be seen from the above, the setting parameter selected by the user is registered on My tab screen according to the process of the flowchart shown in FIG. 15. As the user repeat the above process, a plurality of setting parameters are registered and displayed aggregately on My tab screen.

Moreover, according to the printing condition setting apparatus and the printing condition setting method of the present embodiment, the user can display the desired setting parameters on My tab screen by storing a plurality of My tab screen constitution data in a storage unit such as the hard disk 14 and calling up the desired My tab screen constitution data as the favorite setting. Therefore, the user can set up a printing condition easily without selecting a tab in order to switch the operating screen, by simply modifying the setting values of the setting parameters displayed on My tab screen. More specifically, the user can set up the printing condition with a lesser number of operations (number of clicks) by the number of click for switching the screen compared to the prior art.

Also, according to the printing condition setting apparatus and the printing condition setting method of the present embodiment, the number of favorite settings can be reduced as a plurality of setting parameters whose setting values are modified frequently by the user is displayed aggregately on My tab screen. Therefore, the user can easily identify the desired favorite setting among a list of favorite settings.

As can be seen from the above, the printing condition setting apparatus and the printing condition setting method of the present embodiment allow the user to modify the setting values of the setting parameters without having to switch the operating screen, as the desired setting parameters are displayed on a specific operating screen by the user simply selecting the desired setting parameter data from a plurality of setting parameter data. In other words, the present invention alleviates the user's work in setting up the printing condition.

The invention is not limited to the embodiment described above, but also can be changed in various ways within the scope of the claims.

For example, a PC was used as an example of the printing condition setting apparatus of the present invention in the above embodiment. However, the present invention is not limited to it and it is applicable to MFP (Multi-Function Peripheral) as well.

Also, in the present embodiment, the setting parameters selected by the user are registered on My tab screen. However, the method of registering the setting parameters on My tab screen is not limited to the above embodiment, the setting values of the setting parameters can be judged whether or not they are modified from the default value and only the setting parameters whose setting values have been modified from the default value can be registered on My tab screen.

Also, the screen constitution data of My tab screen is stored in relation with the setup data including the setting values of the setting parameters in the above embodiment. However, only the constitution data of My tab screen can be stored as the favorite setting and called up unrelated to the setup data. More specifically, if one favorite setting is selected from a plurality of favorite settings, the desired setting parameters are displayed on My tab screen while maintaining the setting values in the values immediately before.

The unit and method of conducting various processes in the printing condition setting apparatus according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a storage unit such as a hard disk. Said program can also be provided as independent application software or can be built into the software of the printing condition setting apparatus as a part of its function.

What is claimed is:

1. A printing condition setting apparatus, comprising:
   a setting parameter data storage unit for storing a plurality of setting parameter data, wherein each of the plurality of setting parameter data are assigned to a specific tab setting, each of the plurality of setting parameter data including at least one of a plurality of setting parameters registered by a user's operation, wherein the setting parameters specify printing conditions;
   a setting parameter data reception unit for receiving the user's selection of one of the setting parameter data among said plurality of setting parameter data stored in said setting parameter data storage unit and assigned to the specific tab setting; and
   a setting parameter data call unit for calling up said one of the setting parameter data selected by the user to display the setting parameters included in said one setting parameter data on a specific operating screen.

2. The printing condition setting apparatus as claimed in claim 1, further comprising:
   a setup data storage unit for storing a plurality of setup data including setting values of said setting parameters; and
   a setup data call unit for calling up one setup data among said plurality of setup data to reflect the setting values included in said setup data on said setting parameters.

3. The printing condition setting apparatus as claimed in claim 2, further comprising:
   a association reception unit for receiving the user's selection on whether or not said setting parameter data should be stored in association with said setup data; wherein
   said setting parameter data is stored in association with said setup data in said setting parameter data storage unit, when the user selects to store said setting parameter data in association with said setup data.

4. The printing condition setting apparatus as claimed in claim 3, further comprising:
an identifier assignment unit for assigning an identifier for allowing the user to identify whether or not said setting parameter data and said setup data are stored in association with each other.

5. The printing condition setting apparatus as claimed in claim 1, further comprising:
a position data storage unit for storing position data specifying the position of said setting parameter on said specific operating screen; and
an operating screen constitution unit for displaying said setting parameter on said specific operating screen based on said position data.

6. The printing condition setting apparatus as claimed in claim 1, further comprising:
a setting parameter reception unit for receiving the user's selection of said setting parameter; and
a first setting parameter registration unit for registering said selected setting parameter in said setting parameter data.

7. The printing condition setting apparatus as claimed in claim 1, further comprising:
a setup judgment unit for judging whether or not the setting value of said setting parameter is modified from its initial value; and
a second setting parameter registration unit for registering the setting parameter whose setting value has been modified in said setting parameter data.

8. A printing condition setting method, comprising the steps of:
storing, in a setting parameter data storage unit, a plurality of setting parameter data, wherein each of the setting parameter data are assigned to a specific tab setting, and each of the plurality of setting parameter data including at least one of a plurality of setting parameters registered by a user's operation, wherein the setting parameters specify printing conditions;
receiving the user's selection of one of the setting parameter data among said plurality of setting parameter data stored in said setting parameter data storage unit and assigned to the specific tab setting; and
calling up said one of the setting parameter data selected by the user to display the setting parameters included in said one setting parameter data on a specific operating screen.

9. The printing condition setting method as claimed in claim 8, further comprising:
storing, in a setup data storage unit, a plurality of setup data including setting values of said setting parameters; and
calling up one setup data among said plurality of setup data to reflect the setting values included in said setup data on said setting parameters.

10. The printing condition setting method as claimed in claim 9, further comprising:
receiving the user's selection on whether or not said setting parameter data should be stored in association with said setup data; wherein
storing said setting parameter data in association with said setup data in said setting parameter data storage unit, when the user selects to store said setting parameter data in association with said setup data.

11. The printing condition setting method as claimed in claim 10, further comprising:
assigning an identifier for allowing the user to identify whether or not said setting parameter data and said setup data are stored in association with each other.

12. The printing condition setting method as claimed in claim 8, further comprising:
storing, in a position data storage unit, a position data specifying the position of said setting parameter on said specific operating screen; and
displaying said setting parameter on said specific operating screen based on said position data.

13. The printing condition setting method as claimed in claim 8, further comprising:
receiving the user's selection of said setting parameter; and
registering said selected setting parameter in said setting parameter data.

14. The printing condition setting method as claimed in claim 8, further comprising:
judging whether or not the setting value of said setting parameter is modified from its initial value; and
registering the setting parameter whose setting value has been modified in said setting parameter data.

15. A nontransitory computer readable recording medium stored with a printing condition setting program, said program causing a computer to execute a process comprising the steps of:
storing a plurality of setting parameter data, wherein each of the setting parameter data are assigned to a specific tab setting, and each of the plurality of setting parameter data including at least one of a plurality of setting parameters registered by a user's operation, wherein the setting parameters specify printing conditions in a setting parameter data storage unit;
receiving the user's selection of one of the setting parameter data among said plurality of setting parameter data stored in said setting parameter data storage unit and assigned to the specific tab setting; and
calling up said one of the setting parameter data selected by the user to display the setting parameters included in said one setting parameter data on a specific operating screen.

16. The nontransitory computer readable recording medium stored with a printing condition setting program as claimed in claim 15, the process further comprising:
storing, in a setup data storage unit, a plurality of setup data including setting values of said setting parameters; and
calling up one setup data among said plurality of setup data to reflect the setting values included in said setup data on said setting parameters.

17. The nontransitory computer readable recording medium stored with a printing condition setting program as claimed in claim 16, the process further comprising:
receiving the user's selection on whether or not said setting parameter data should be stored in association with said setup data; wherein
storing said setting parameter data in association with said setup data in said setting parameter data storage unit, when the user selects to store said setting parameter data in association with said setup data.

18. The nontransitory computer readable recording medium stored with a printing condition setting program as claimed in claim 17, the process further comprising:
assigning an identifier for allowing the user to identify whether or not said setting parameter data and said setup data are stored in association with each other.

19. The nontransitory computer readable recording medium stored with a printing condition setting program as claimed in claim 15, the process further comprising:
storing, in a position data storage unit, a position data specifying the position of said setting parameter on said specific operating screen; and
displaying said setting parameter on said specific operating screen based on said position data.

20. The nontransitory computer readable recording medium stored with a printing condition setting program as claimed in claim 15, the process further comprising:

receiving the user's selection of said setting parameter; and registering said selected setting parameter in said setting parameter data.

21. The nontransitory computer readable recording medium stored with a printing condition setting program as claimed in claim 15, the process further comprising:

judging whether or not the setting value of said setting parameter is modified from its initial value; and registering the setting parameter whose setting value has been modified in said setting parameter data.

* * * * *